(12) United States Patent
Schoenauer et al.

(10) Patent No.: US 7,237,836 B2
(45) Date of Patent: Jul. 3, 2007

(54) MOTOR VEHICLE ROOF

(75) Inventors: Miriam Schoenauer, Nandelstadt (DE);
Joachim Birkner, Puchheim (DE);
Michael Koelbl, Neuried (DE);
Alexander Lang, Munich (DE); Rudi
Muttenhammer, Germering (DE);
Martin Pollak, Puchheim (DE); Ralf
Schwaighofer, Neubeuern (DE);
Friedhelm Wulf, Munich (DE);
Jean-Guy Cocaign, Rochester, MI (US)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/381,873

(22) Filed: May 5, 2006

(65) Prior Publication Data

US 2006/0186709 A1 Aug. 24, 2006

Related U.S. Application Data

(62) Division of application No. 10/928,703, filed on Aug. 30, 2004.

(30) Foreign Application Priority Data

Aug. 28, 2003 (DE) .................. 103 40 022

(51) Int. Cl.
*B60J 7/22* (2006.01)
*B60J 1/02* (2006.01)

(52) U.S. Cl. ............... 296/217; 296/84.1; 296/193.12; 296/96.12

(58) Field of Classification Search ............... 296/217, 296/84.1, 193.12, 96.12
See application file for complete search history.

(56) References Cited

U.S. PATENT DOCUMENTS

| 2,964,352 | A | * | 12/1960 | Werner ..................... 296/91 |
| 4,113,302 | A | * | 9/1978 | Bos ........................ 296/217 |
| 4,872,722 | A | | 10/1989 | Farmont |
| 5,009,463 | A | * | 4/1991 | Saitoh et al. ............... 296/210 |
| 5,174,644 | A | * | 12/1992 | Hermansson et al. ....... 362/492 |
| 5,451,091 | A | | 9/1995 | Schleicher |
| 6,227,613 | B1 | * | 5/2001 | Maciejewski et al. ...... 296/217 |
| 6,244,653 | B1 | * | 6/2001 | Nishio et al. .......... 296/216.09 |
| 6,315,356 | B1 | | 11/2001 | Tolinski |
| 6,331,031 | B1 | | 12/2001 | Patz et al. |
| 6,513,864 | B2 | | 2/2003 | Bohm et al. |
| 6,758,517 | B1 | | 7/2004 | Raasakka |
| 2004/0075302 | A1 | * | 4/2004 | Chon et al. ................. 296/210 |
| 2004/0075304 | A1 | | 4/2004 | Cocaign |

FOREIGN PATENT DOCUMENTS

DE   34 29 880 A1   2/1986
JP   63-31820   *   2/1988 ................. 296/217

* cited by examiner

*Primary Examiner*—Dennis H. Pedder
(74) *Attorney, Agent, or Firm*—David S. Safran

(57) ABSTRACT

A motor vehicle roof with a roof plate which has a transparent plastic area to which a peripheral plastic edge is molded which is used especially as a cover visor and which extends downward. Furthermore, the roof plate has a non-transparent area with a holding frame for a functional element molded onto a bottom thereof

6 Claims, 5 Drawing Sheets

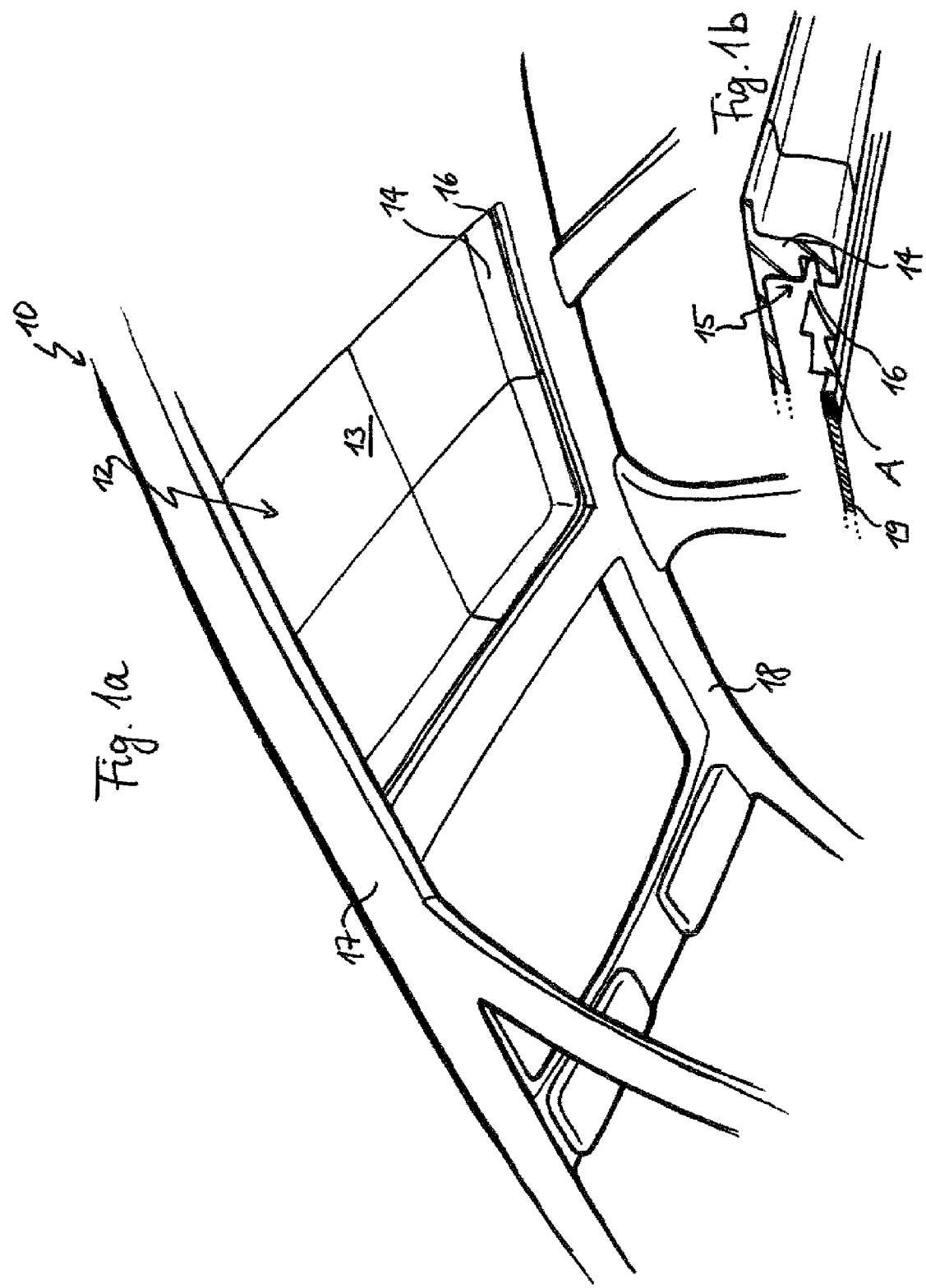

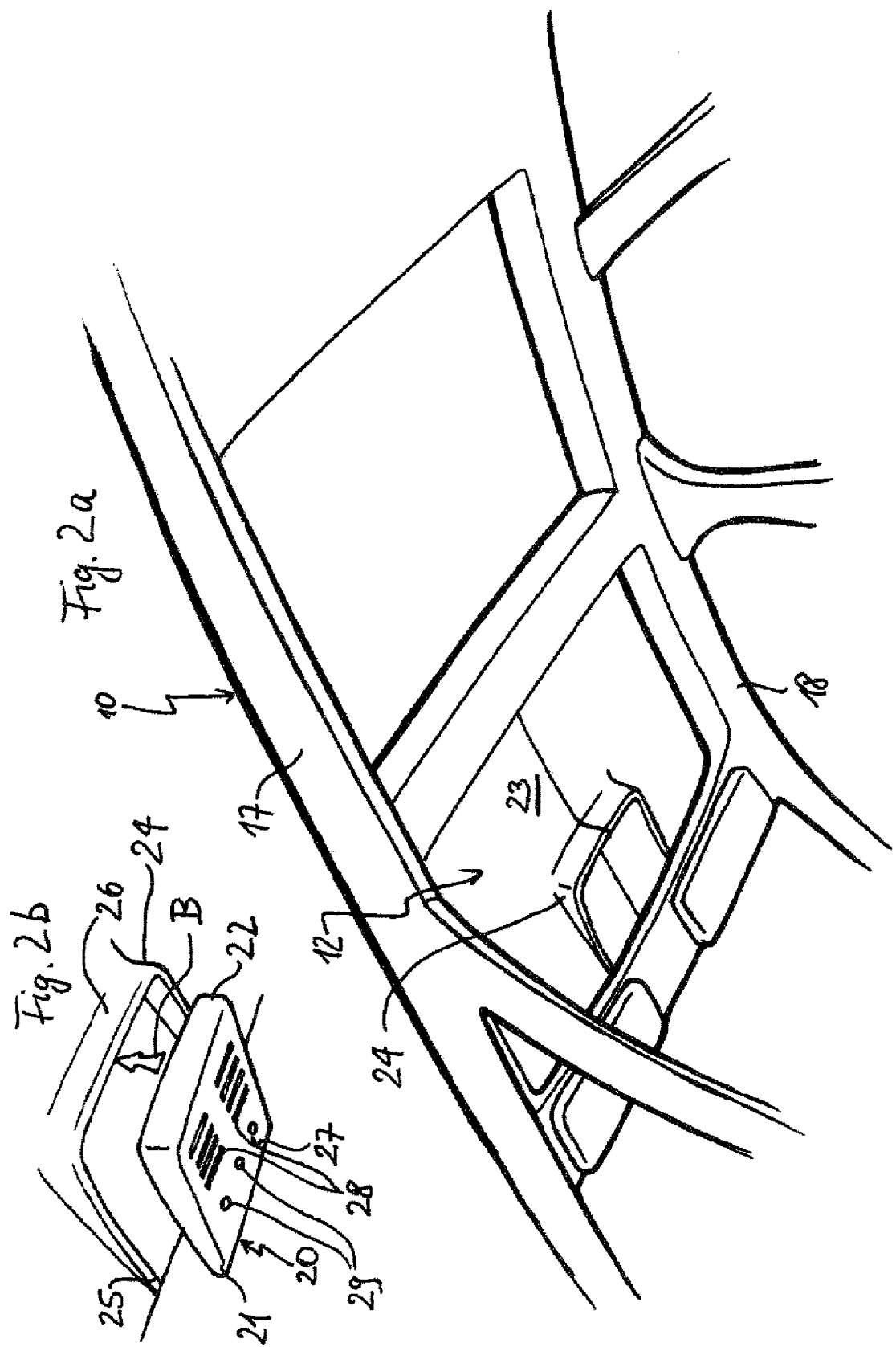

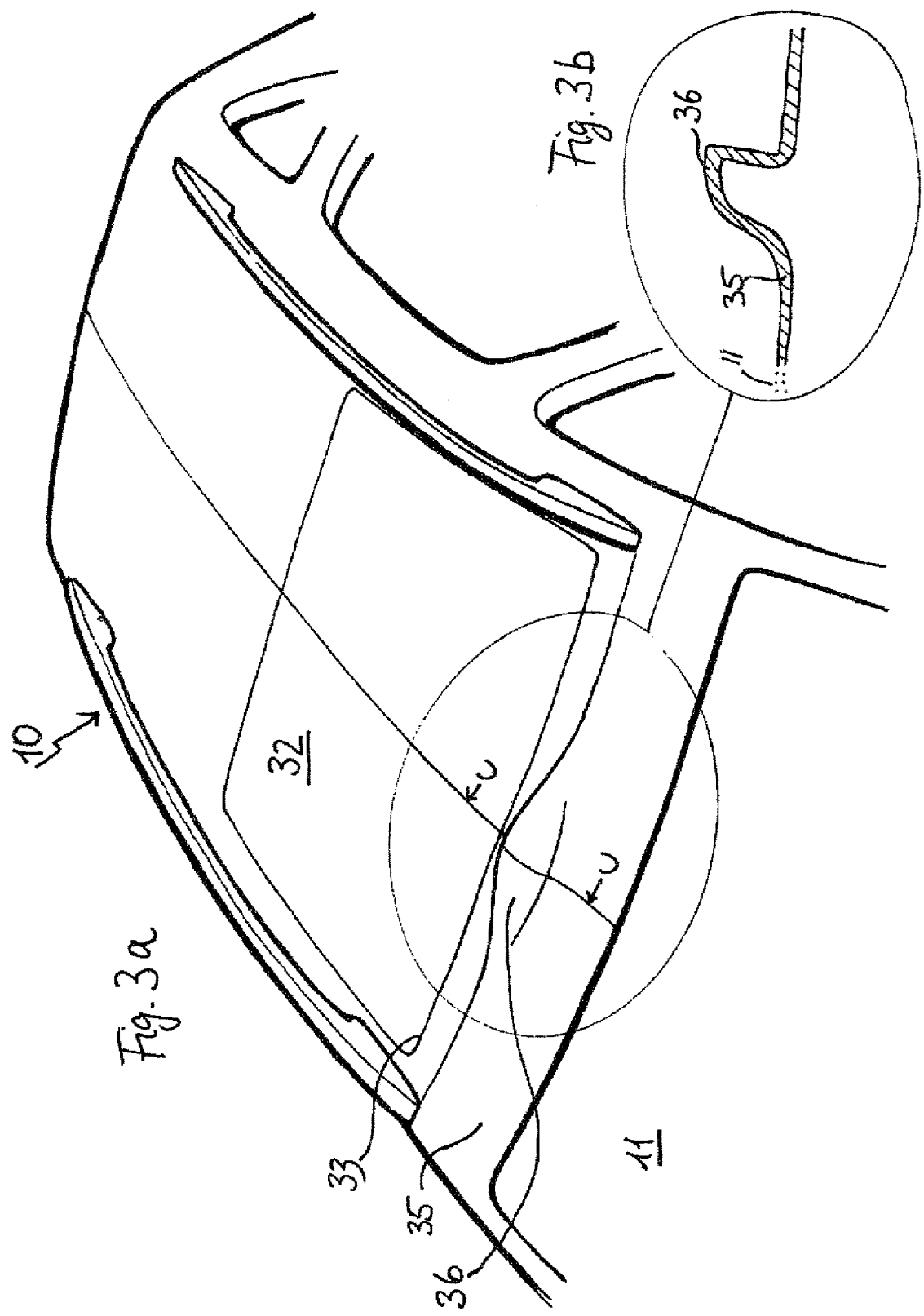

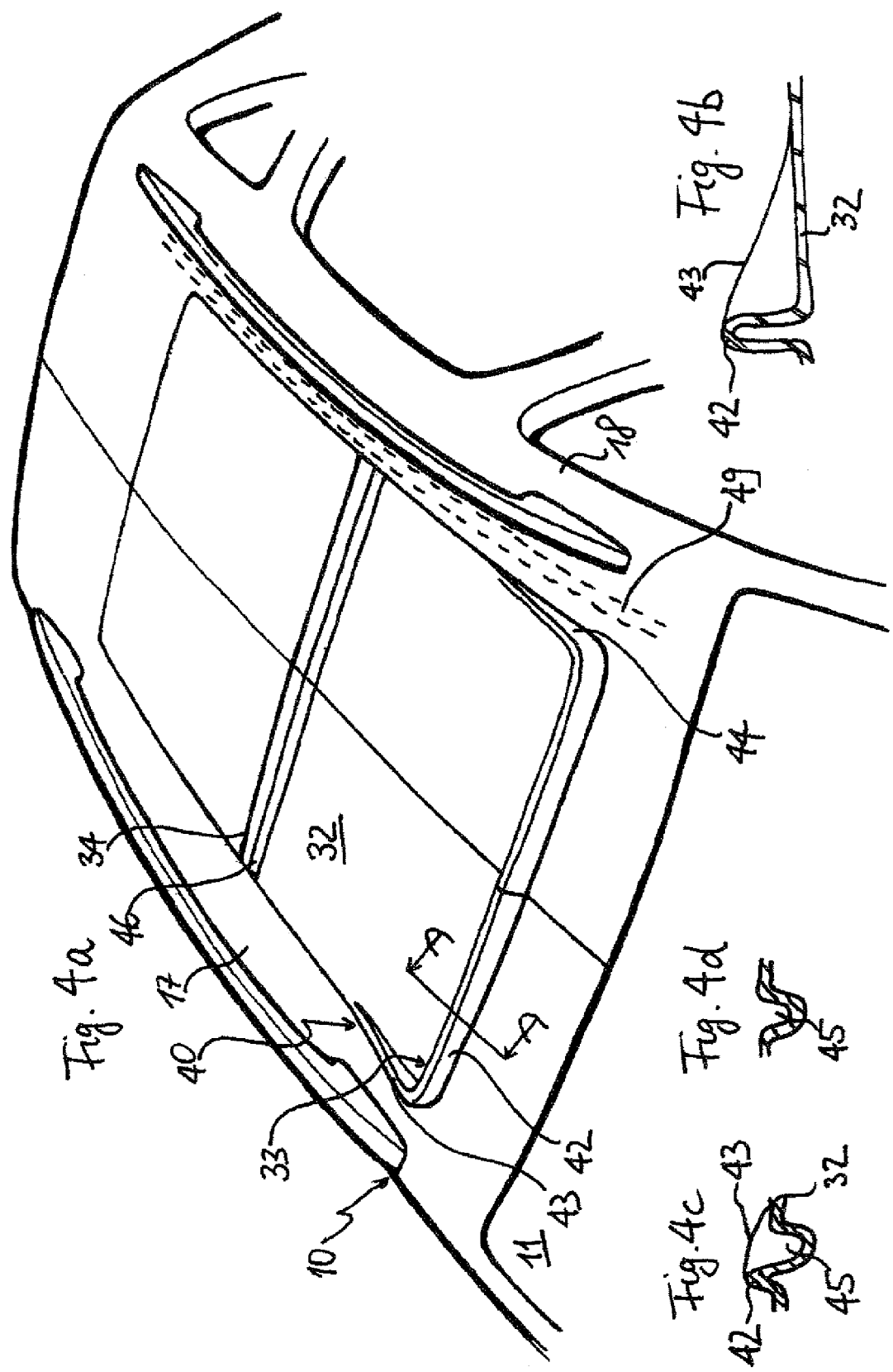

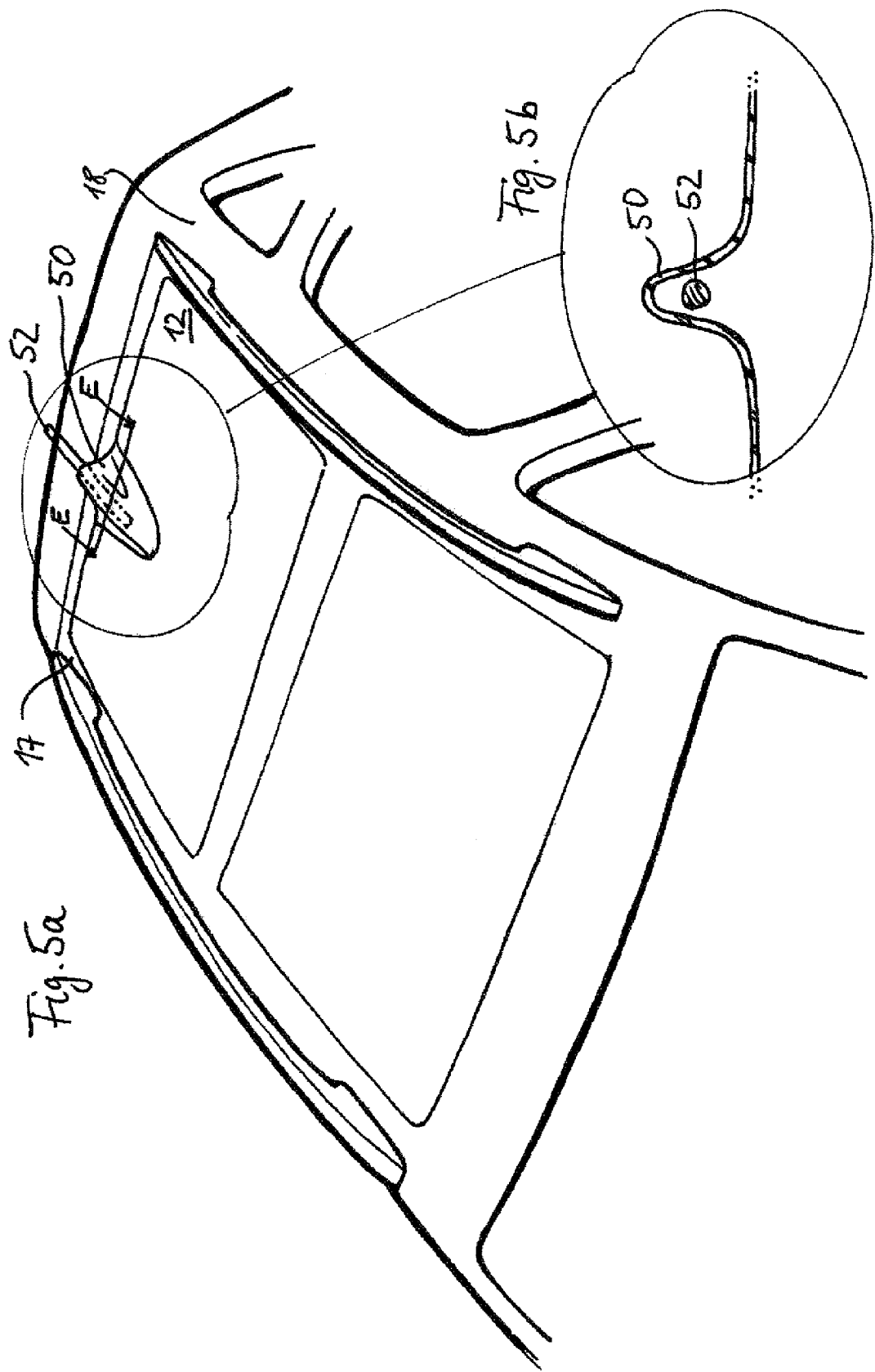

MOTOR VEHICLE ROOF

CROSS-REFERENCE TO RELATED APPLICATION

This application is a division of U.S. patent application Ser. No. 10/928,703 filed Aug. 30, 2004.

BACKGROUND OF THE INVENTION

1. Field of the Invention

The invention relates to motor vehicle roofs with a roof plate of plastic or an openable cover of plastic.

2. Description of Related Art

Wrap-around glass roofs are known which have a frame to which a solid glass pane is cemented. The disadvantage here is that an independent cementing process for the solid glass pane is necessary and that visible joints in the transition to transparent areas are inevitable. Moreover, for each function which is to be provided in addition, at least one other component must be produced and installed.

Published German Patent Application DE 34 29 880 A1 discloses a motor vehicle roof with a roof plate which is made as a pre-mounted assembly or roof module. The roof module can be joined by snaps to the body. Thus, a certain amount of facilitation of installation is possible, but the attainable efficiency increases are limited.

Published European Patent Application EP 0 164 532 A2, which corresponds to U.S. Pat. No. 4,872,722, discloses a sunroof with a transparent cover for motor vehicles in which there is a shade device which can taken up and which can be clamped underneath the cover. The take-up device for the shade device is integrated into a multi-part holding device which holds the cover and is clamped to the vehicle superstructure. This sunroof comprises many different parts and is therefore complex to install.

German Patent Application DE 43 21 915 C1, which corresponds to U.S. Pat. No. 5,451,091, discloses strip-shaped side visors for at least partially covering the edge gaps which are formed between the side edges of the raised glass cover of sliding roofs or sliding and lifting roofs and the fixed roof skin on motor vehicles. The side visors are molded on an edge frame to which the glass cover is peripherally foamed. In these sliding roofs, the number of parts to be produced is also large and requires a not inconsiderable production effort.

SUMMARY OF THE INVENTION

A primary object of the present invention is to provide a motor vehicle roof in which the number of components which is to be produced and mounted can be reduced, and thus, the installation and logistics cost can be reduced, and in which seamless transitions to transparent areas can be formed.

This object is achieved by a motor vehicle roof in accordance with the present invention by the roof plate roof plate having a transparent plastic area with a molded-on, downwardly extending peripheral plastic edge which is used especially as a cover visor or with a plastic apron to which at least one wind deflector is molded or with an arch which is used as an antenna shroud or as an antenna holding device molded on the top of the roof plate. Additionally, a cover can be molded from plastic with a water drainage means integrated on its top. This object is further achieved by the vehicle roof having a plastic roof plate which covers the roof surface between roof side members, the having a nontransparent area with a holding frame for a functional element molded onto a bottom thereof.

In this way, the number of components can be drastically reduced, and thus, the resulting installation and logistics costs reduced, and at the same time, a seamless transition between the individual molded-on components, therefore also between the transparent areas and the nontransparent areas, can be achieved. Moreover, various styling possibilities which did not exist in the prior art are enabled by the one-piece production of different components especially from polycarbonate.

The more different components of plastic are integrated into a single component in accordance with the invention, which generally takes place by molding on, the more dramatically production costs can be saved because fewer components in and of themselves need be produced and fewer of these components need be joined to other components.

Within the framework of this invention, a "roof plate" is defined as the most varied surfaces above the equator of the vehicle. This includes, for example, also a rear window or a rear hatch.

Embodiments of the motor vehicle roof in accordance with the invention are explained in detail below with reference to the accompanying drawings.

BRIEF DESCRIPTION OF THE DRAWINGS

FIG. 1a is a schematic perspective view of a first embodiment of a motor vehicle roof as viewed from the left rear and FIG. 1b shows a section in the lengthwise direction of the vehicle, FIG. 2a is a schematic perspective view of a second embodiment of a motor vehicle roof as viewed from the left rear and FIG. 2b shows an enlarged perspective partial representation from FIG. 2a, illustrating installation of a functional element, FIG. 3a is a schematic perspective view of a third embodiment of a motor vehicle roof as viewed from the left front and FIG. 3b shows an enlarged representation of a partial section along C-C in FIG. 3a, FIG. 4a shows a schematic perspective of a fourth embodiment of a motor vehicle roof as viewed from the left front and FIGS. 4b to 4d show sections taken along line D-D in FIG. 4a but showing versions that are different from that of FIG. 4a, and FIG. 5a is a schematic perspective view of a fourth embodiment of a motor vehicle roof as viewed from the left front and FIG. 5b shows a section taken along line E-E in FIG. 5a.

DETAILED DESCRIPTION OF THE INVENTION

The motor vehicle roof 10 in accordance with the invention according to the first embodiment of FIG. 1a comprises a roof plate 12 made of plastic, especially polycarbonate, which forms the roof surface between the left side member 17 and the right side member 18. The roof plate 12 has a transparent area 13, such as, for example, a fixed or movable cover which makes it possible to look outward from the vehicle interior. There is a sunshade arrangement 19—for example, a sunshading blind or a sliding head liner— (compare FIG. 1b) which can be moved between the open position and the closed position by means of a movement mechanism (not shown). In the open position, it is possible to look through the transparent area 13 to the outside from the vehicle interior, and in the closed position, the sunshade arrangement 19 prevents entry of sunlight through the transparent area 13 or at least greatly reduces it. A visor 14 which surrounds the transparent area 13 in the form of a peripheral edge which extends downward is integrated into the roof plate 12, the visor 14 covers the movement mechanism of the sunshade arrangement 19 and/or the mechanism of a movable cover.

The visor 14 is produced from plastic and it is made in one piece with the transparent area 13, i.e. is molded to the transparent area 13. In the visor 14, a holding and guide arrangement 15 for the sunshade arrangement 19 is integrated; it is made as a groove 16 as shown in FIG. 1*b*. Preferably, the groove is extends peripherally, as is apparent from FIG. 1*a*. When the sunshade arrangement 19, for example, is a sunshading blind which can be taken up on a take-up device (not shown), when the sunshading blind is pulled out to the rear (see, arrow A in FIG. 1*b*), it is guided in the parts of the groove 16 which run in the lengthwise direction of the vehicle, and at the end of the pulling-out process the back end of the blind is held in the back part of the groove 16 which runs in the transverse direction of the vehicle and which is shown only in FIG. 1*b*.

In a second embodiment, the motor vehicle roof 10 of the invention comprises a roof plate 12 of plastic which forms the roof surface between the side members 17, 18. The roof plate 12 comprises a non-transparent area 23 which, in the representation of FIG. 2*a*, is located directly behind the windshield apron. A plastic holding frame 24 for a functional element 20 is molded onto the underside of the non-transparent area 23. This functional element can, for example, be a control console 27 for the actuation of a rear hatch, a sunshade arrangement or a sliding roof, by means of control keys 29. The functional element 20 can also be an illumination means 28, can contain one, or can be in the form of a tray.

The functional element 20 can be coupled at its front end 21 to the front 25 of the holding frame 24 and can be swung down at its rear end 22. The rear end 22 can be locked in the area of the back 26 of the holding frame 24. Alternatively, the functional element 20, as a whole, can be removed from the holding frame 24 and can be inserted in the direction of the arrow B in FIG. 2*b* into the holding frame 24, for example, and held by catches.

In a third embodiment (see FIGS. 3*a* and 3*b*), the motor vehicle roof 10 in accordance with the invention has an openable cover 32 which is located behind a plastic windshield apron 35. On the back end of the windshield apron 35, in the middle of the vehicle, a plastic wind deflector 36 which is used to prevent drumming noise is molded on. In contrast to FIG. 3*a*, there can also be several wind deflectors 36. The wind deflector 36, in a lengthwise section (section along C-C in FIG. 3*a*) has the profile shown in FIG. 3*b*. The front of the wind deflector 36 is made with a curved shape which is favorable for aerodynamics, while its back is essentially perpendicular to the surface of the apron 34. In this way, the Unit formed of the apron 35 and the wind deflector 36 can be easily removed from a corresponding shaping tool. If the back has an undercut, removal from the mold is possible only with at least one additional slide.

It can be especially advantageous to make the apron 35 with the wind deflector 36 together with the front window 11 from the same plastic in one working process. This enables a reduction of production costs.

In a fourth embodiment (see FIGS. 4*a* to 4*d*) of the motor vehicle roof 10 as of the invention, there is an openable plastic cover 32 with a water drainage means 40 integrated on its top. FIG. 4*a* shows a first version of this water drainage means 40. It comprises a bead 42 which is molded on the front end 33 of the cover 32 and projects upward. The bead 42 extends over the entire width of the cover 32. The two transverse ends of the bead 42 are adjoined by a right-hand bead extension 43 and a left-hand bead extension 44, which extend to the rear in the lengthwise direction of the vehicle The height of the bead extensions 43, 44 decreases from front to rear, and the top of the bead extensions passes flush into the top surface of the cover 32. The profile of the bead 42 is shown schematically in FIG. 4*b*. With the water drainage means 40 in accordance with the invention, it is possible to reliably prevent the water which has collected on the cover 32 from running into the vehicle interior when the cover 32 is raised at its rear edge or is moved to the rear underneath the motor vehicle roof 10.

In addition to the bead 42, as another version as shown in FIG. 4*c*, there can be a depression 45 which is behind the bead 42 and which extends optionally also along the bead extensions 43, 44. Alternatively, instead of the beads 42 to 44, there can be only a depression 45 which is used as a gutter. In order to also provide the back end 34 of the cover 32 with protection against water running into the vehicle interior, it is a good idea to provide a gutter 46 there. The water which has collected on the beads 42 to 44 or in the gutter 46 can flow out laterally into water rails provided for this purpose when the cover 32 is at least partially opened. A water rail 49 is shown schematically in the left side member 17.

In a fifth embodiment of the invention (see FIGS. 5*a* and 5*b*), an arch 50 of plastic, which is used as a shroud or holder for an antenna, is molded onto a roof plate 12 of plastic. The profile of the arch 50 is shown schematically in FIG. 5*b* which shows a cross section along line E-E in FIG. 5*a*.

The aforementioned components are, as already mentioned, made from plastic, especially from a transparent polycarbonate. Therefore it is easily possible to impart the desired shape to them and to produce them as one piece in a single tool. In this way, functions can be integrated which, with a glass cover, require their own parts. This type of one-piece production—in any case with the current production technology—cannot be achieved with a glass roof plate, but in the past, the individual components had to be screwed to the corresponding glass roof or to other roof elements.

It must be stated that the features of the invention which have been described with reference to the individual embodiments, such as, for example, the sunshade arrangement, functional element, wind deflector, water drainage means and antenna holder or antenna shroud, can also be present in other embodiments and in various combinations with each other and with additional elements, except when it is indicated otherwise or is prohibited by itself for technical reasons.

What is claimed is:

1. Motor vehicle roof, comprising:
   a fixed roof area having a windshield apron and extending rearwardly from the roof apron between lateral side members, the fixed roof area having a roof opening formed therein behind the roof apron; and
   an openable transparent plastic cover for opening and closing said roof opening, wherein the fixed roof area is formed of plastic, wherein the plastic of part of the windshield apron is configured in the shape of at least one upstanding wind deflector.

2. Motor vehicle roof according to claim 1, wherein the part of the windshield apron that is configured in the shape of at least one upstanding wind deflector has a front with a curved shape which is favorable for aerodynamics, and a back which is essentially perpendicular to surface areas of the apron adjoining the back of the at least one upstanding wind deflector.

3. Motor vehicle roof as claimed in claim 2, wherein said at least one upstanding wind deflector is formed by a hollow bead in the plastic of the fixed roof area which projects upward and extends in a transverse direction of the fixed roof area.

4. Motor vehicle roof according to claim 1, the fixed roof area has a nontransparent area which is configured in the shape of a molded-in holding frame for a functional element; and wherein a front end of the functional element is coupled to a front of the holding frame and the back end of the functional element is able to swing down.

5. Motor vehicle roof as claimed in claim 4, wherein said holding frame is formed by a bead in the plastic of the fixed roof area which projects downward and extends in a transverse direction of the vehicle, ends of the bead being adjoined by bead extensions which extend in a lengthwise direction of the vehicle, and wherein a bottom end of the bead extensions merge rearwardly down to a bottom surface of the nontransparent area.

6. Motor vehicle roof as claimed in claim 1, wherein the windshield apron is made in one piece with a front windshield.

\* \* \* \* \*